United States Patent Office 3,644,382
Patented Feb. 22, 1972

3,644,382
BENZIMIDAZOLE DERIVATIVES OF BENZOIC ACID AND ITS ESTERS AND AMIDES
Francois Clemence, Rosny-sous-Bois, and Odile Le Martret, Paris, France, assignors to Roussel-UCLAF, Paris, France
No Drawing. Filed Mar. 18, 1969, Ser. No. 808,298
Claims priority, application France, Mar. 20, 1968,
144,581, June 20, 1968, 155,808, 155,810
Int. Cl. C07d 49/38
U.S. Cl. 260—295 F                    19 Claims

ABSTRACT OF THE DISCLOSURE

Benzimidazoles of the formula

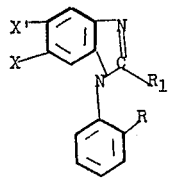

(I)

wherein X and X' may be different and are selected from the group consisting of hydrogen, halogen, alkyl, alkoxy, trihalomethyl and nitro, R is selected from the group consisting of —COOH, —COOR', and

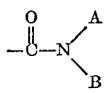

R' is selected from the group consisting of aliphatic and hydroxylated residue of a glycol, A and B are selected from the group consisting of hydrogen and optionally substituted aliphatic and $R_1$ is selected from the group consisting of hydrogen, lower aliphatic hydrocarbon, unsubstituted and polysubstituted aryl, arylaliphatic, a thienyl, a $\beta$-pyridyl and a furyl with the proviso that when $R_1$ is phenyl, X' and X are other than halogen, alkoxy and trifluoromethyl which compounds possess anti-inflammatory and antiviral activity and a novel process for their preparation.

OBJECTS OF THE INVENTION

It is an object of the invention to provide the novel benzimidazoles of Formula I and novel intermediates therefor.

It is another object of the invention to provide novel processes for the preparation of the benzimidazoles of Formula I.

It is a further object of the invention to provide novel therapeutic compositions.

It is an additional object of the invention to provide methods for combatting inflammations and virus in warm-blooded animals.

These and other objects and advantages of the invention will become obvious from the following detailed description.

THE INVENTION

The novel benzimidazoles of the invention have the formula

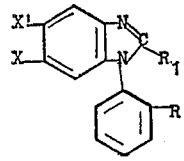

(I)

wherein X and X' may be different and are selected from the group consisting of hydrogen, halogen, alkyl, alkoxy, trihalomethyl and nitro, R is selected from the group consisting of —COOH, —COOR', and

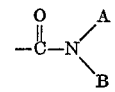

R' is selected from the group consisting of aliphatic and hydroxylated residue of a glycol, A and B are selected from the group consisting of hydrogen and optionally substituted aliphatic and $R_1$ is selected from the group consisting of hydrogen, lower aliphatic hydrocarbon, unsubstituted and polysubstituted aryl, arylaliphatic, a thienyl, a $\beta$-pyridyl and a furyl with the proviso that when $R_1$ is phenyl, X' and X are other than halogen, alkoxy and trifluoromethyl. The benzimidazoles of Formula I possess interesting pharmacological activities, particularly remarkable anti-inflammatory activity and at higher dosages a sedative activity on the central nervous system. Also the said compounds possess anti-viral activity, particularly against the influenza virus, which activity is not due to its anti-inflammatory activity since known anti-inflammatory agents such as cortisone acetate, phenylbutazone or indomethacine do not have anti-viral activity.

Preferred benzimidazole compounds of Formula I are those where X and X' are selected from the group consisting of hydrogen, fluorine, chlorine, bromine, iodine, lower alkyl and alkoxy of 1 to 7 carbon atoms, trifluoromethyl and nitro, R' is selected from the group consisting of lower alkyl and hydroxylated residue of a glycol, A and B are selected from the group consisting of hydrogen and lower alkyl and $R_1$ is selected from the group consisting of hydrogen, lower alkyl, phenyl optionally poly substituted with at least two members of the group consisting of halogen, sulfamido, lower alkyl and lower alkoxy, phenyl lower alkyl, $\alpha$-thienyl, $\beta$-pyridyl and $\alpha$-furyl.

Examples of specific compounds within the scope of Formula I are 1-(o-carbomethoxyphenyl)-benzimidazole;
1-(o-carboethoxyphenyl)-benzimidazole;
1-(o-carbomethoxyphenyl)-5-methoxy-benzimidazole;
1-(o-carboxyphenyl)-benzimidazole;
1-(o-carbobutoxyphenyl)-benzimidazole;
1-(o-$\beta$-hydroxyethylcarbamylphenyl)-benzimidazole;
1-(o-isopropylidine-$\beta,\gamma$-dioxypropoxycarbonylphenyl)-benzimidazole;
1-(o-$\beta,\gamma$-dihydroxypropoxycarbonylphenyl)-benzimidazole;
1-(o-carbomethoxyphenyl)-2-$\alpha$-thienyl-benzimidazole;
1-(o-carbomethoxyphenyl)-2-(3',4'-dichlorophenyl)-benzimidazole;
1-(o-carbomethoxyphenyl)-2-methyl-benzimidazole and
1-(o-carboxyphenyl)-5-nitro-benzimidazole.

The novel process of the invention for the preparation of the benzimidazoles of Formula I comprises acylating a phenylenediamine of the formula

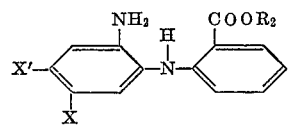

II wherein X and X' have the above definitions and $R_2$ is selected from the group consisting of hydrogen, lower alkyl and hydroxylated residue of a glycol with an acylating agent of an organic carboxylic acid to form an N-acyl-o-phenylenediamine of the formula

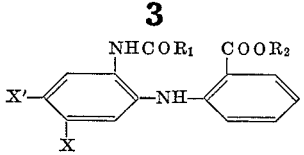

wherein $R_1$ and $R_2$, X and X' have the above definitions, cyclizing the latter with a dehydrating agent to obtain a benzimidazole of the formula

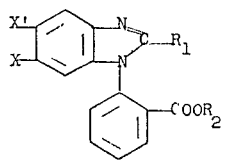

which may be esterified if $R_2$ is hydrogen or saponified if $R_2$ is other than hydrogen to obtain the free acid which may then be re-esterified or converted into an amide by heating with ammonia or an amine or trans-esterified into another ester.

In a preferred mode of the process of the invention, the phenylenediamine of Formula II is reacted with an acid halide of an organic carboxylic acid of 1 to 10 carbon atoms in the presence of a tertiary amine such as triethylamine or heterocyclic base such as pyridine in the presence or absence of an inert organic solvent such as aromatic hydrocarbon, preferably toluene or xylene. Cyclization is effected with a dehydrating agent such as an aliphatic or aromatic carboxylic acid, i.e., formic acid, or a phosphorus halide, i.e. phosphorus oxychloride.

In a modification of the process of the invention, the phenylenediamine of Formula II can be directly cyclized to the benzimidazole of Formula Ia with heating with an excess of a carboxylic acid or its anhydride with the excess acting as the solvent.

The starting material, N-(o-aminophenyl)-anthranilic acid and its esters, may be prepared by the processes described in U.S. Pat. No. 3,291,790, or Hanze et al. (J. Med. Chem., vol. 6, 1963, p. 767) or Hunziker (Arzn. Forsch., vol. 13, 1963, p. 324).

The novel anti-inflammatory compositions of the invention are comprised of an effective amount of at least one benzimidazole of Formula I and a major amount of a pharmaceutical carrier. The usual individual dose is 0.250 to 0.500 gm. The compositions may be in the form of injectable or ingestible solutions or suspensions, tablets, coated tablets, sachets, capsules, granules, syrups, drops and suppositories prepared in the usual manner.

The compositions are useful for the treatment of acute or chronic rheumatic complaints, of radicular algias or lumbar sciaticas due to their anti-flammatory activity. They are also useful because of their sedative action, for the treatment of neurotic conditions, emotional psychoses, anxiety, distress, conditions of agitation and convulsions and functional disorders of organic origin induced or heightened by psychic tension. They increase and prolong considerably the effect of hypnogenic medicaments, specifically increase the narcotic activity of barbiturates and maintain this activity by allowing a reduction of the dose of barbiturate administered.

The novel method of treating inflammation in warm-blooded animals comprises administering to warm-blooded animals a safe and effective amount of at least one benzimidazole of Formula I. The said compounds may be administered orally, transcutaneously or rectally and the usual daily dose is 4 to 40 mg./kg. depending upon the method of administration.

EXAMPLE I

Preparation of 1-(o-carbomethoxyphenyl)-benzimidazole

Step A: Methyl 2 - (2' - formamidophenyl) - anthranilate.—A mixture of 2.43 g. of methyl N-(o-aminophenyl) anthranilate and 1.2 cc. of formic acid was heated for an hour at 100° C. and the reaction mixture was extracted with ether. The ethereal phase was washed with an aqueous solution of potassium carbonate and then with 10% hydrochloric acid and was evaporated to dryness to obtain methyl 2-(2'-formamidophenyl)-anthranilate in the form of colorless crystals melting at 120° C. after recrystallization from ethanol.

Analysis.—$C_{15}H_{14}N_2O_3$; molecular weight=270.28: Calculated (percent): N, 10.37. Found (percent): N, 10.32.

I.R. spectrum (carbon tetrachloride): Bands at 3320 cm.$^{-1}$ and 3400 cm.$^{-1}$.

As far as is known, this compound is not described in the literature.

Step B: 1-(o-carbomethoxyphenyl) - benzimidazole.—The methyl 2-(2'-formamidophenyl)anthranilate was cyclized by heating in the presence of an excess of formic acid or in the presence of phosphorus oxychloride to obtain 1-(o-carbomethoxyphenyl)-benzimidazole in the form of colorless crystals melting at 88° C.

Analysis.—$C_{15}H_{12}N_2O_2$; molecular weight=252.26: Calculated (percent): C, 71.41; H, 4.80; N, 11.10. Found (percent): C, 71.60; H, 4.80; N, 11.10.

As far as is known, this compound is not described in the literature.

EXAMPLE II

Preparation of 1-(o-carbomethoxyphenyl)-benzimidazole

A mixture of 57.34 g. of methyl N-(o-aminophenyl)-anthranilate and 28.6 cc. of formic acid was heated at 130° C. for 2 hours and then ether was added to. The ether solution was extracted with 10% hydrochloric acid. The extract was made alkaline with an aqueous solution of potassium carbonate and then was extracted with ether. After evaporation of the solvent and recrystallization from isopropyl ether, there was obtained 37.35 g. (yield=62.5%) of 1-(o - carbomethoxyphenyl) - benzimidazole identical with the product obtained in Example I.

EXAMPLE III

Preparation of 1-(o-carbethoxyphenyl)-benzimidazole

Using the procedure of Example II, ethyl N-(o-aminophenyl)-anthranilate was heated for five hours at 130° C. to obtain an 80% yield of 1 - (o - carbethoxyphenyl)-benzimidazole which after recrystallization from isopropyl ether melted at 62° C.

Analysis.—$C_{16}H_{14}N_2O_2$; molecular weight=266.29: Calculated (percent): N, 10.52. Found (percent): N, 10.54.

As far as is known, this compound is not described in the literature.

EXAMPLE IV

Preparation of 1-(o-carbomethoxyphenyl)-5-methoxy-benzimidazole

A mixture of 40.8 g. of methyl N-(2-amino-4-methoxyphenyl)-anthranilate and 18 cc. of formic acid was heated for two hours at 130° C. and then was cooled. The mixture was extracted with chloroform and the chloroform phases were washed with water. After evaporation of the solvent 38.7 g. of crude product were obtained which were dissolved in 10% hydrochloric acid. The solution was made alkaline with an aqueous solution of potassium carbonate and extracted with chloroform. After evaporation of the solvent and recrystallization from ethanol, an 87% yield of 1 - (o - carbomethoxyphenyl) - 5 - methoxy-benzimidazole melting at 146° C. was obtained.

Analysis.—$C_{16}H_{14}N_2O_3$; molecular weight=282.29: Calculated (percent): C, 68.07; H, 4.99; N, 9.92. Found (percent): C, 68.0; H, 4.9; N, 10.1.

As far as is known, this compound is not described in the literature.

Using the procedure of Example I, Step A, methyl N - (2 - amino - 4 - methoxy - phenyl) - anthranilate and formic acid were treated to obtain methyl 2 - (2'-formamido - 4' - methoxyphenyl) - anthranilate melting at 98–100° C.

As far as is known, this compound is not described in the literature.

Using the procedure of Example I, Step B, 1-(o-carbomethoxyphenyl)-5-methoxy-benzimidazole, identical with the product obtained above, was obtained.

EXAMPLE V

Preparation of 1-(o-carboxyphenyl)-benzimidazole

A mixture of 27.18 g. of N - (o - aminophenyl) - anthranilic acid and 28.6 cc. of formic acid was heated for an hour at 130° C. and then the reaction mixture was poured into water. After filtration, there was obtained a 71% yield of 1 - (o - carboxyphenyl) - benzimidazole in the form of colourless crystals after recrystallization from ethanol and the product melted at 254° C.

Analysis.—$C_{14}H_{10}N_2O_2$; molecular weight=238.24: Calculated (percent): N, 11.76. Found (percent): N, 11.88.

This compound was also obtained by saponification with potassium hydroxide of 1-(o-carbomethoxyphenyl)-benzimidazole obtained in Example I.

As far as is known, this compound is not described in the literature.

EXAMPLE VI

Preparation of 1-(o-butoxycarbonylphenyl)-benzimidazole

Using the procedure of Example II, formic acid and butyl N-(o-aminophenyl)-anthranilate were reacted to obtain a 70% yield of colorless crystals 1-(o-butoxycarbonylphenyl)-benzimidazole which after recrystallization from isopropyl ether melted at 76° C.

Analysis.—$C_{18}H_{18}N_2O_2$; molecular weight=294.34: Calculated (percent): N, 9.52. Found (percent): N, 9.48.

As far as is known, this compound is not described in the literature.

EXAMPLE VII

Preparation of 1-(o-β-hydroxyethylcarbamylphenyl)-benzimidazole 5.9 g. of 1-(o-butoxycarbonylphenyl)-benzimidazole (obtained according to Example VI) was heated for five hours at 140° C. with 10 cc. of monoethanolamine. After distilling off the excess amine, the residue was taken up in water and vacuum filtered. The precipitate was recrystallized from ethyl acetate to obtain a 63% yield of 1-(o-β-hydroxyethyl-carbamylphenyl)-benzimidazole in the form of colourless needles melting at 145° C.

Analysis.—$C_{16}H_{15}N_3O_2$; molecular weight=281.30: Calculated: N, 14.94%. Found: N, 14.89%.

As far as is known, this compound is not described in the literature.

EXAMPLE VIII

Preparation of 1-(o-isopropylidene-β-γ-dioxypropoxycarbonylphenyl)-benzimidazole A solution of 44.35 g. of 1-(o-carbomethoxyphenyl) benzimidazole (obtained in Example I) in 204 cc. of isopropylidene glycerol in the presence of 2.4 g. of sodium methylate was heated at 120° C. for five hours under nitrogen. The excess isopropylidene glycerol was distilled off under slight pressure and after recrystallization from isopropyl ether 72% yield 1-(o-isopropylidene-β,γ-dioxypropoxycarbonylphenyl)benzimidazole in the form of colourless crystals melting at 88–89° C. was obtained.

Analysis.—$C_{20}H_{20}N_2O_4$; molecular weight=352.37: Calculated: N, 7.95%. Found: N, 7.97–8.0%.

As far as is known, this compound is not described in the literature.

EXAMPLE IX

Preparation of 1-(o-β-γ-dihydroxypropoxycarbonylphenyl)benzimidazole

A solution of 44.85 g. of 1-(o-isopropylidene-β,γ-dioxypropoxycarbonylphenyl)-benzimidazole (obtained according to Example VIII) in 127 cc. of 2 N hydrochloric acid was heated at reflux for fifteen minutes in the presence of animal charcoal. After filtration, 150 cc. of water were added to the filtrate and the pH was adjusted to 8 by the addition of potassium carbonate. The solution was extracted with chloroform, and the extract was evaporated to dryness in vacuo. The residue was recrystallized from ethyl acetate to obtain an 81.5% yield of 1-(o-β-γ-dihydroxypropoxycarbonylphenyl)benzimidazole in the form of crystals melting at 105–106° C.

Analysis.—$C_{17}H_{16}N_2O_4$; molecular weight=312.32: Calculated: N, 8.97%. Found: N, 8.92%.

As far as is known, this compound is not described in the literature.

EXAMPLE X

Preparation of 1-(o-carbomethoxyphenyl)-2α-thienyl-benzimidazole

Step A: Methyl 2-(2'-α-thenoyl-aminophenyl)-aminobenzoate.—3.38 g. of α-thenoic acid chloride was added between −15° and 0° C. to a solution of 4.85 g. of methyl N-(o-aminophenyl)-anthranilate in 35 cc. of pyridine. After evaporating the pyridine off under reduced pressure, the residue was dissolved in chloroform and the chloroform solution was washed with 10% hydrochloric acid, then with an aqueous solution of potassium carbonate. The solvent was distilled off in vacuo and after recrystallization of the residue from ethanol, a 70% yield of methyl 2-(2'-α-thenoylamino-phenyl)amino-benzoate was obtained in the form of colourless crystals melting at 150° C.

Analysis.—$C_{19}H_{16}N_2O_3S$; molecular weight=352.41: Calculated (percent): C, 64.75; H, 4.58; N, 7.95; S, 9.10. Found (percent): C, 64.9; H, 4.7–4.8; N, 7.8; S, 9.4.

As far as is known, this compound is not described in the literature.

Step B: 1-(o-carbomethoxyphenyl)-2-α-thienyl-benzimidazole.—A solution of 6.92 g. of methyl 2-(2'-α-thenoylaminophenyl)-amino-benzoate in 30 cc. of phosphorus oxychloride was heated at reflux for three hours and the excess phosphorus oxychloride was distilled off. The residue was dissolved in chloroform and the chloroform solution was washed with an aqueous solution of potassium carbonate. After evaporation of the solvent and recrystallization from ethyl acetate, a 49% yield of 1-(o-carbomethoxyphenyl)-2-α-thienyl-benzimidazole in the form of colorless crystals melting at 115° C. was obtained.

Analysis.—$C_{19}H_{14}N_2O_2S$; molecular weight=334.38: Calculated (percent): N, 8.38; S, 9.59. Found (percent): N, 8.33; S, 9.65.

As far as is known, this compound is not described in the literature.

EXAMPLE XI

Preparation of 1-(o-carbomethoxyphenyl)-2-(3',4'-dichlorophenyl)-benzimidazole

Step A: Methyl 2-[2'-(3,4-dichloro benzamido)-phenyl]-anthranilate. 19.4 g. of methyl N-(o-aminophenyl)-anthranilate were dissolved in 750 cc. of xylene and 16.8 cc. of triethylamine and after adding 19.2 g. of 3,4-dichlorobenzoic acid chloride thereto, while keeping the temperature under 35° C., the solution was heated to reflux for three hours. The precipitate of triethylamine hydrochloride was filtered off and a product crystallized by cooling. After recrystallization from ethyl acetate, a 74% yield of methyl 2-[2'-(3,4-dichlorobenzamido)-phenyl]-anthranilate in the form of colorless needles melting at 191–192° C. was obtained.

*Analysis.*—$C_{21}H_{16}N_2O_3Cl_2$; molecular weight=415.26: Calculated (percent): N, 6.75; Cl, 17.07. Found (percent): N, 6.75; Cl, 17.06.

As far as is known, this compound is not described in the literature.

Step B: 1-(o-carbomethoxy-phenyl)-2-(3',4'-dichlorophenyl)-benzimidazole.—Using the process of Step B of Example X, 5.5 g. of methyl 2-[2'-(3,4-dichlorobenzamido)phenyl]-anthranilate and 25 cc. of phosphorus oxychloride were reacted to obtain, after recrystallization from isopropyl ether a 92% yield of 1-(o-carbomethoxyphenyl) - 2 - (3',4'-dichlorophenyl)-benzimidazole in the form of colorless crystals melting at 114° C.

*Analysis.*—$C_{21}H_{14}N_2O_2Cl_2$; molecular weight=397.25: Calculated (percent): C, 63.49; H, 3.55; N, 7.05; Cl, 17.85. Found (percent): C, 63.6; H, 3.3; N, 7.0; Cl, 17.9.

As far as is known, this compound is not described in the literature.

EXAMPLE XII

Preparation of 1-(o-carbomethoxyphenyl)-2-methyl-benzimidazole

A mixture of 4.85 g. of methyl N-(o-aminophenyl)-anthranilate and 10 cc. of acetic anhydride was heated at reflux for five hours. The excess acetic anhydride was distilled off under slight pressure, and the mixture was extracted with chloroform. The chloroform phases were washed with water and the solvent was evaporated. After recrystallization from isopropyl ether, a 48% yield of 1-(o-carbomethoxyphenyl) - 2 - methyl-benzimidazole in the form of colorless crystals melting at 144° C. was obtained.

*Analysis.*—$C_{16}H_{14}N_2O_2$; molecular weight=266.29; Calculated: N, 10.52%. Found: N, 10.49%.

As far as is known, this compound is not described in the literature.

The same compound was prepared by using the procedure of Example X with the intermediate, methyl 2-(2'-acetamidophenyl)-anthranilate melting at 144° C.

As far as is known, this compound is not described in the literature.

EXAMPLE XIII

Preparation of 1-(o-carboxyphenyl)-5-nitro-benzimidazole

A suspension of 1.37 g. of N-(2-amino-4-nitro-phenyl)-anthranilic acid in 12 cc. of formic acid was heated at reflux for one hour. The mixture was then diluted with water and suction-filtered. The precipitate thus formed was recrystallized from acetic acid to obtain a 63% yield of 1-(o-carboxyphenyl)-5-nitrobenzimidazole in the form of crystals melting at 280–282° C.

*Analysis.*—$C_{14}H_9N_3O_4$; molecular weight=283.24; Calculated: N, 14.83%. Found: N, 14.50–14.44%.

As far as is known, this compound is not described in the literature.

EXAMPLE XIV

Using the procedure of Example XII, methyl N-(o-aminophenyl)-anthranilate was reacted to obtain (A), 1-[o-carbomethoxyphenyl] - 2- ethyl-benzimidazole melting at 120° C.; (B) 1-(o-carbomethoxyphenyl) - 2 - benzyl-benzimidazole melting at 98° C.; (C) 1-(o-carbomethoxyphenyl)-2-(α-furyl)-benzimidazole melting at 124° C.; (D) 1-o-carbomethoxyphenyl) - 2 - (β-pyridyl)-benzimidazole melting at 127° C.; and 1-(o-carbomethoxyphenyl)-2-(3'-sulfamido-4'-chlorophenyl)-benzimidazole melting at 236° C.

As far as is known, these compounds are not described in the literature.

The same five compounds were prepared by the process of Example X with the following intermediates: (A') methyl 2-(2'-propionamidophenyl)-anthranilate melting at 122° C.; (B') methyl 2-(2'-phenylacetamidophenyl)-anthranilate melting at 133° C.; (C') methyl 2-[2'-(α-furoyl) aminophenyl]-anthranilate melting at 124° C.; (D') methyl 2-(2'-nicotinoylaminophenyl)-anthranilate melting at 140° C.; and (E') methyl 2-[2'-(3-sulfamido-4-chlorobenzamido)-phenyl]-anthranilate melting at 206° C.

EXAMPLE XV

Using the procedure of Example XIII, 1-(o-carboxyphenyl)-5-chloro-benzimidazole melting at 250° C. was obtained.

PHARMACOLOGICAL DATA

(A) Acute toxicity

The acute toxicity of the products of the invention was determined on male mice weighing about 20 gm. each. The products were administered in suspension in water containing 5% gum arabic at varying dosages. The animals were kept under observation for one week. The average dose at which 50% of the animals died ($DL_{50}$) was then determined by the method of Dragstedt and Lang. The results are set forth in Table I.

TABLE I

| Products | $DL_{50}$ Intra-peritoneal | $DL_{50}$ Subcutaneous |
|---|---|---|
| 1-(o-carbomethoxyphenyl)-benzimidazole | >2 g./kg. | >2 g./kg. |
| 1-(o-carboxyphenyl)-benzimidazole | 923 mg./kg. | >2 g./kg. |
| 1-(o-butoxycarbonylphenyl)-benzimidazole | >2 g./kg. | >2 g./kg. |
| 1-(o-β,)dihydroxypropoxycarbonylphenyl)-benzimidazole. | 868 mg./kg. | >2 g./kg. |
| 1-(o-N-β-hydroxyethylcarbamylphenyl)-benzimidazole. | 1,420 mg./kg. | >2 g./kg. |
| 1-(o-carbethoxyphenyl)-benzimidazole | 1,375 mg./kg. | >2 g./kg. |
| 1-(o-carbomethoxyphenyl)-5-methoxybenzimidazole. | >2 g./kg. | >2 g./kg. |
| 1-(o-isopropylidene-β,α-dioxypropoxycarbonylphenyl)-benzimidazole. | >2 g./kg. | >2 g./kg. |
| 1-(o-carbomethoxyphenyl)-2-benzylbenzimidazole. | >2 g./kg. | >2 g./kg. |
| 1-(o-carbomethoxyphenyl)-2-(3',4'-dichlorophenyl)-benzimidazole. | >2 g./kg. | >2 g./kg. |
| 1-(o-carbomethoxyphenyl)-2-methyl-benzimidazole. | 1,850 mg./kg. | >2 g./kg. |
| 2-(β-pyridyl)-1-(o-carbomethoxyphenyl)-benzimidazole. | 1,150 mg./kg. | >2 g./kg. |
| 1-(o-carbomethoxyphenyl)-2-p-methoxyphenyl-benzimidazole. | >2 g./kg. | >2 g./kg. |
| 1-(o-carbomethoxyphenyl)-2-(3'-sulfamido-4'-chlorophenyl)-benzimidazole. | >2 g./kg. | >2 g./kg. |

The oral $DL_{50}$ of 1-(o-carbomethoxyphenyl)-benzimidazole was greater than 3 g./kg.

(B) Anti-inflammatory activity

The anti-inflammatory activity was determined on male rats weighing between 130 to 150 gm. by administering 0.05 cc. of a 1% suspension of carrageenin in the plantary aponevrose of the hind paw. Immediately after, the product studied was injected intraperitoneally in suspension in a 5% aqueous solution of gum arabic. The volume of the paw was measured 2, 4, 6, 8 and 24 hours after the injection. The maximum inflammation intensity was 4 to 6 hours after the injection of carrageenin and the difference in the volume of the paws of the treated animals and the control animals was the evidence of the anti-inflammatory activity of the test compound. The results showing the percentage of protection at different dosages with different compounds are shown in Table II.

TABLE II

| Product | Doses administered in mg./kg. | Percent of protection |
|---|---|---|
| 1-(o-carbomethoxyphenyl)-2-(p-methoxyphenyl)-benzimidazole. | 25 | 57 |
|  | 50 | 71 |
| 1-(o-carbomethoxyphenyl)-2-benzyl-benzimidazole. | 100 | 25 |
|  | 500 | 46 |
| 1-(o-carbomethoxyphenyl)-2-(3',4'-dichlorophenyl)-benzimidazole. | 100 | 47 |
|  | 500 | 45 |
| 1-(o-carbomethoxyphenyl)-2-methyl-benzimidazole. | 74 (1/25 $DL_{50}$) | 47 |
|  | 370 (1/5 $DL_{50}$) | 57 |
| 2-(β-pyridyl)-1-(o-carbomethoxyphenyl)-benzimidazole. | 100 | 33 |
|  | 500 | 60 |
| 1-(o-carbomethoxyphenyl)2-(3'-sulfamyl-4'-chlorophenyl)-benzimidazole. | 100 | 43 |
|  | 500 | 70 |

TABLE II—Continued

| Product | Doses administered in mg./kg. | Percent of protection |
|---|---|---|
| 1-(o-carbomethoxyphenyl)-benzimidazole | 50 | 8.6 |
|  | 100 | 22.8 |
|  | 200 | 33.8 |
| 1-(o-carboxyphenyl)-benzimidazole | 37 (1/25 DL₅₀) | 33 |
|  | 185 (1/5 DL₅₀) | 60 |
| 1-(o-β,γ-dihydroxypropoxy-carbonylphenyl)-benzimidazole | 35 (1/25 DL₅₀) | 30 |
|  | 174 (1/5 DL₅₀) | 64 |
| 1-(o-N-β-hydroxyethylcarbamylphenyl)-benzimidazole | 57 (1/25 DL₅₀) | 38 |
|  | 284 (1/5 DL₅₀) | 50 |
| 1-(o-carbethoxyphenyl)-benzimidazole | 57 (1/25 DL₅₀) | 50 |
|  | 275 (1/5 DL₅₀) | 57 |
| 1-(o-isopropylidene-β,γ-dioxypropoxy-carbonylphenyl)-benzimidazole | 100 | 44 |
|  | 500 | 71 |
| 1-(o-carbomethoxyphenyl)-5-methoxy-benzimidazole | 100 | 38 |
|  | 500 | 31 |
| 1-(o-butoxycarbonylphenyl)-benzimidazole | 100 | 56 |
|  | 500 | 57 |

Using the same test procedure as above except for administering orally, the following results were obtained for 1-(o-carbomethoxyphenyl)-benzimidazole: 100 mg./kg.—14.8%; 200 mg./kg.—37.0%; and 400 mg./kg.—68.3%.

(C) Neurosedative activity

The neurosedative activity was determined by the spontaneous motility test and the potentialization of narcosis caused by barbiturates.

(1) Motility.—The motility was studied by use of the behavior-cage test. Immature male rats, each weighing about 40 gm., were placed two by two in these cages, and their moves were electronically registered when the animals passed in front of an ultraviolet light beam directed onto their cage. The motility was expressed in the number of passages per minute at intervals of 10 minutes. Thus it could be determined at which moment the maximum intensity of hyperactivity was recorded and if this intensity was lasting. The results are shown in Table III. The products were administered by intraperitoneal way.

TABLE III

| Products | Doses administered in mg./kg. | Percent motility |
|---|---|---|
| 1-(o-β,γ-dihydroxypropoxycarbonylphenyl)-benzimidazole | 35 (1/25 DL₅₀) | −23 |
|  | 174 (1/5 DL₅₀) | −50 |
| 1-(o-carbomethoxyphenyl)-2-p-methoxyphenyl-benzimidazole | 100 | −56 |
|  | 500 | −72 |
| 1-(o-N-β-hydroxyethylcarbamylphenyl)-benzimidazole | 57 (1/25 DL₅₀) | −38 |
|  | 284 (1/5 DL₅₀) | −42 |
| 1-(o-carbethoxyphenyl)-benzimidazole | 57 (1/25 DL₅₀) | −38 |
|  | 275 (1/5 DL₅₀) | −88 |
| 1-(o-isopropylidene-β,γ-dioxypropoxycarbonylphenyl)-benzimidazole | 100 | −35 |
|  | 500 | −70 |
| 1-(o-carbomethoxyphenyl)-5-methoxy-benzimidazole | 100 | −37 |
|  | 500 | −57 |
| 1-(o-carbomethoxyphenyl)-benzimidazole | 50 | −27 |
|  | 100 | −45 |
|  | 200 | −57 |
| 1-(o-carbomethoxyphenyl)-2-benzyl-benzimidazole | 100 | −50 |
|  | 500 | −33 |
| 1-(o-carbomethoxyphenyl)-2-(3',4'-dichlorophenyl)-benzimidazole | 100 | −40 |
|  | 500 | −35 |
| 1-(o-carbomethoxyphenyl)-5-methoxy-benzimidazole | 100 | −37 |
|  | 500 | −57 |
| 1-(o-carbomethoxyphenyl)-2-(3'-sulfamyl-4'-chlorophenyl)-benzimidazole | 100 | −28 |
|  | 500 | −61 |
| 1-(o-carbomethoxyphenyl)-2-methyl-benzimidazole | 74 (1/25 DL₅₀) | −55 |
|  | 370 (1/5 DL₅₀) | −60 |

(2) Potentialization of narcosis.—Narcosis was provoked with Secobarbital administered intraperitoneally at a dose of 40 mg./kg. to male mice weighing about 20 gm. The test products were administered intraperitoneally in an aqueous suspension of gum arabic at varying dosages simultaneously with Secobarbital. The results expressed as a percent increase in the time of sleep are shown in Table IV.

TABLE IV

| Product | Doses, administered in mg./kg. | Percent increase |
|---|---|---|
| 1-(o-carbomethoxyphenyl)-2-methylbenzimidazole | 74 (1/25 DL₅₀) | +53 |
|  | 370 (1/5 DL₅₀) | +71 |
| 2-(β-pyridyl)-1-(o-carbomethoxyphenyl)-benzimidazole | 46 (1/25 DL₅₀) | +91 |
|  | 230 (1/5 DL₅₀) | +203 |
| 1-(o-carbomethoxyphenyl)-2-(3'-sulfamyl-4'-chlorophenyl)-benzimidazole | 100 | +10 |
|  | 500 | +39 |
| 1-(o-carbomethoxyphenyl)-5-methoxy-benzimidazole | 100 | +18 |
|  | 500 | +42 |
| 1-(o-carbomethoxyphenyl)-benzimidazole | 80 (1/25 DL₅₀) | +43 |
|  | 400 (1/5 DL₅₀) | +275 |
| 1-(o-carboxyphenyl)-benzimidazole | 37 (1/25 DL₅₀) | +11 |
|  | 185 (1/5 DL₅₀) | +42 |
| 1-(o-butoxycarbonylphenyl)-benzimidazole | 100 | +23 |
|  | 500 | +54 |
| 1-(o-N-β-hydroxyethyl-carbonylphenyl)-benzimidazole | 57 (1/25 DL₅₀) | +30 |
|  | 284 (1/5 DL₅₀) | +80 |
| 1-(o-carbethoxyphenyl)-benzimidazole | 57 (1/25 DL₅₀) | +45 |
|  | 275 (1/5 DL₅₀) | +130 |
| 1-(o-isopropylidene-β,γ-dioxypropoxycarbonylphenyl)-benzimidazole | 100 | +12 |
|  | 500 | +53 |

The results shown in the above tables clearly demonstrate that the products of Formula I possess important anti-inflammatory and sedative activity. At the same time, the said products showed no effect on muscle tone or reflexes and therefore do not have any tranquilizing effect.

Various modifications of the compositions and method of the invention may be made without departing from the spirit or scope thereof.

We claim:
1. A benzimidazole of the formula

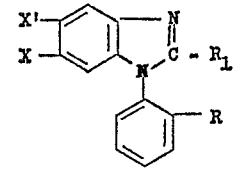

wherein X and X' may be different and are selected from the group consisting of hydrogen, halogen, alkyl and alkoxy each of 1 to 7 carbon atoms, trihalomethyl and nitro, R is selected from the group consisting of —COOH, —COOR' and

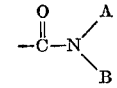

R' is selected from the group consisting of lower alkyl and polyhydroxylated lower alkyl, A and B are selected from the group consisting of hydrogen and lower alkyl and R₁ is selected from the group consisting of hydrogen, lower alkyl, phenyl optionally polysubstituted with at least two members of the group consisting of halogen and sulfamido, phenyl lower alkyl, α-thienyl, β-pyridyl and α-furyl with the proviso that when R₁ is phenyl, X' and X are other than halogen, alkoxy and trifluoromethyl.

2. A compound of claim 1 which is 1-(o-carbomethoxyphenyl)-benzimidazole.

3. A compound of claim 1 which is 1-(o-carboethoxyphenyl)-benzimidazole.

4. A compound of claim 1 which is 1-(o-carbomethoxyphenyl)-5-methoxy-benzimidazole.

5. A compound of claim 1 which is 1-(o-carboxyphenyl)-benzimidazole.

6. A compound of claim 1 which is 1-(o-carbobutoxyphenyl)-benzimidazole.

7. A compound of claim 1 which is 1-(o-β-hydroxyethylcarbamylphenyl)-benzimidazole.

8. A compound of claim 1 which is 1-(o-isopropylidene-β,γ-dioxypropoxycarbonylphenyl)-benzimidazole.

9. A compound of claim 1 which is 1-(o-β,γ-dihydroxypropoxycarbonylphenyl)-benzimidazole.

10. A compound of claim 1 which is 1-(o-carbomethoxyphenyl)-2-(α-thienyl)-benzimidazole.

11. A compound of claim 1 which is 1-(o-carbomethoxyphenyl)-2-(3',4'-dichlorophenyl)-benzimidazole.

12. A compound of claim 1 which is 1-(o-carbomethoxyphenyl)-2-methylbenzimidazole.

13. A compound of claim 1 which is 1-(o-carboxyphenyl)-5-nitro-benzimidazole.

14. A compound of claim 1 which is 1-(o-carbomethoxyphenyl)-2-ethyl-benzimidazole.

15. A compound of claim 1 which is 1-(o-carbomethoxyphenyl)-2-benzyl-benzimidazole.

16. A compound of claim 1 which is 1-(o-carbomethoxyphenyl)-2-(α-furyl)-benzimidazole.

17. A compound of claim 1 which is 1-(o-carbomethoxyphenyl)-2-(β-pyridyl)-benzimidazole.

18. A compound of claim 1 which is 1-(o-carbomethoxyphenyl)-2-(3' - sulfamido-4'-chlorophenyl) - benzimidazole.

19. A compound of claim 1 which is 1-(o-carboxyphenyl)-5-chlorobenzimidazole.

References Cited

UNITED STATES PATENTS 3,284,463  11/1966  Goldsmith et al. ___ 260—309.2
3,541,109  11/1970  Kauer _____ 260—309.2

OTHER REFERENCES

Green et al., J. Amer. Chem. Soc., vol. 64, pp. 1167–73 (1946). QD1.A5.

McKee et al., J. Amer. Chem. Soc., vol. 69, p. 471 (1947). QD1.A5.

McKee et al., J. Amer. Chem. Soc., vol. 68, pp. 1904–5. QD1.A5.

Wright, Chem. Rev., vol. 48, pp. 397, 401–8, 411–16, and 426–8 relied upon (1951). QD1.A53.

Meldola et al., J. Chem. Soc. (London), vol. 95, pp. 1033–42 relied upon (1909). QD1.C6.

Arient et al., Chem. Abst., vol. 55, col. 15488 (1961). QD1.A51.

Arient et al., Chem. Abst., vol. 62, col. 10558 (1965). QD1.A51.

NATALIE TROUSOF, Primary Examiner

U.S. Cl. X.R.

260—295 AM, 309.2, 471 R, 518 A, 518 R, 519; 424—263, 273